E. G. FISCHER.
ARTIFICIAL HORIZON.
APPLICATION FILED JAN. 29, 1921.

1,386,695.

Patented Aug. 9, 1921.
2 SHEETS—SHEET 1.

INVENTOR
Ernst G. Fischer.
BY
Fred G. Dieterich Co.
ATTORNEYS

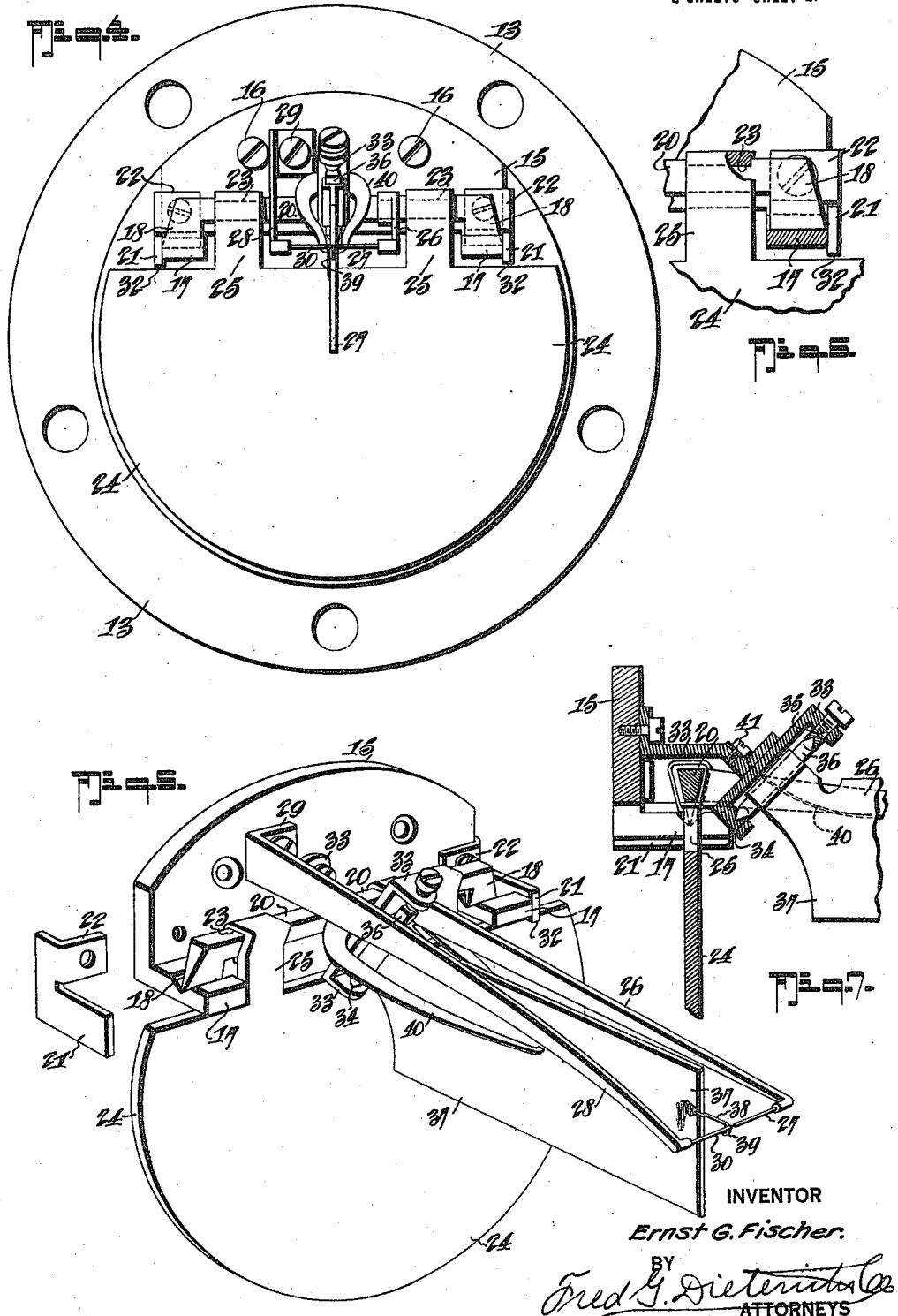

UNITED STATES PATENT OFFICE.

ERNST GEORG FISCHER, OF WASHINGTON, DISTRICT OF COLUMBIA.

ARTIFICIAL HORIZON.

1,386,695.   Specification of Letters Patent.   Patented Aug. 9, 1921.

Application filed January 29, 1921.   Serial No. 441,001.

*To all whom it may concern:*

Be it known that I, ERNST G. FISCHER, a citizen of the United States, residing at Washington, in the District of Columbia, have invented a new and Improved Artificial Horizon, of which the following is a specification.

This invention has for its object to provide an artificial horizon for sextants, hand or mounted levels, and other surveying and astronomical apparatus requiring exact definition of either the horizon or vertical.

Generically the invention comprises a pendulum device containing a pair of pendulum-vanes, one of which has a horizon line which is coöperative with another horizon line that is relatively fixedly mounted on the instrument, the other pendulum-vane having a point which coöperates with the horizon lines, all being arranged so that when the instrument is held in the true vertical position and in a position to bring both horizon lines in longitudinal alinement, the point will appear in a central position with relation to the horizon lines and the horizon lines will then correspond to the true horizon.

In its more specific nature, the invention includes pendulum-vanes of relatively small mass and large area (suspended in a manner to reduce bearing friction to the minimum), in its motions opposed to air or a suitable liquid so that the oscillations of the pendulum-vanes are damped and as nearly dead-beat as is practicable, yet sensitive to the smallest departure from the normal; a small light arm being attached to one pendulum-vane and carrying a piece of fine platinum wire mounted horizontally, there being a small piece of platinum wire fixed to the apparatus supporting the pendulum-vane in such manner that, when adjusted, and the vane is at rest, the wires are in longitudinal alinement.

The other vane also carries a piece of fine platinum wire having its free end located in proximity to the horizon line wires in such manner that, when adjusted and the vane is at rest, the end of said last named wire will be centrally disposed with relation to the horizon wires and assure the verticality of the plane in which an angle above the horizon is to be measured.

Inasmuch as my invention has been especially designed for use in connection with the sextant, I have illustrated the invention as applied to such an instrument and shall describe the same in that relation, although I wish it understood that, in its use, the invention is not limited to sextants but may be employed wherever a device of this nature is found useful.

In its more subordinate nature, the invention also includes those novel details of construction, combination and arrangement of parts, all of which will be first fully described and then be specifically pointed out in the appended claims, reference being had to the accompanying drawings, in which:

Fig. 5 is a detail perspective view of the pendulum mechanism and the bracket which supports the same.

Fig. 6 is an enlarged detail view of a portion of the same.

Fig. 7 is a vertical central longitudinal section of a portion of the mechanism shown in Fig. 5.

Fig. 8 is a magnified view of the image visible through the eye piece, when the true horizon is indicated.

In the drawings in which like numerals of reference designate like parts in all of the figures, 1 represents the sextant which is of the ordinary construction and, *per se*, forms no part of the present invention. Therefore, a detailed description of the same is thought to be unnecessary.

Figure 1:
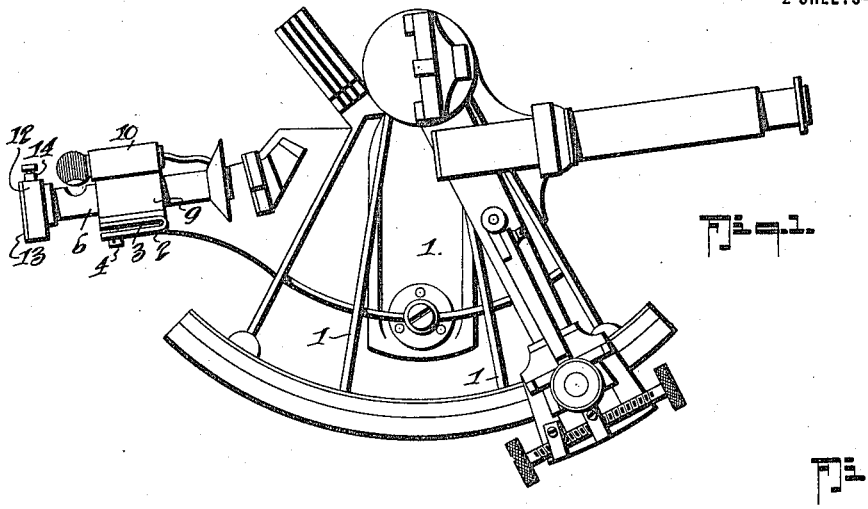
Figure 1 is an elevation of a sextant with the invention applied.

When my invention is applied to a sextant, the sextant is provided with an arm to which a bracket 2 is secured, the same being provided with a U-shaped portion formed by bending back a part 3 on which the device is mounted.

4 is an adjustment screw by which the axis of the device may be inclined to line up properly with the telescope of the sextant.

Secured to the plate 3 is a holder 5 in which a tube 6 is suitably mounted. The forward end of the tube 6 is provided with a collimating lens 7 which is so mounted that its principal focus lies in the horizon wires of the device hereinafter again referred to.

At the outer end of the tube is mounted a pendulum device which constitutes the essential part of the present invention. This device consists of a receptacle 12 mounted on the end of the tube 6 and having a chamber in communication with the interior of the tube 6, the holder having a collar into which the tube fits.

The chamber in the receptacle 12 is provided for the pendulum-vane 24.

13 is the disk or cap plate for the receptacle 12, on which plate the pendulum apparatus is mounted. The cap 13 is secured by screws, as indicated.

The tube 6 is provided with a window 8 that is mounted in an inwardly projecting collar, so constructed as to prevent the accumulation of air bubbles on the glass of the window, when liquid is used as a dampening medium.

Adjacent to the window 8, the tube is provided with a transparent partition 31, when liquid is used as a dampening medium, to retain the liquid in the forward end of the tube.

Figure 2:
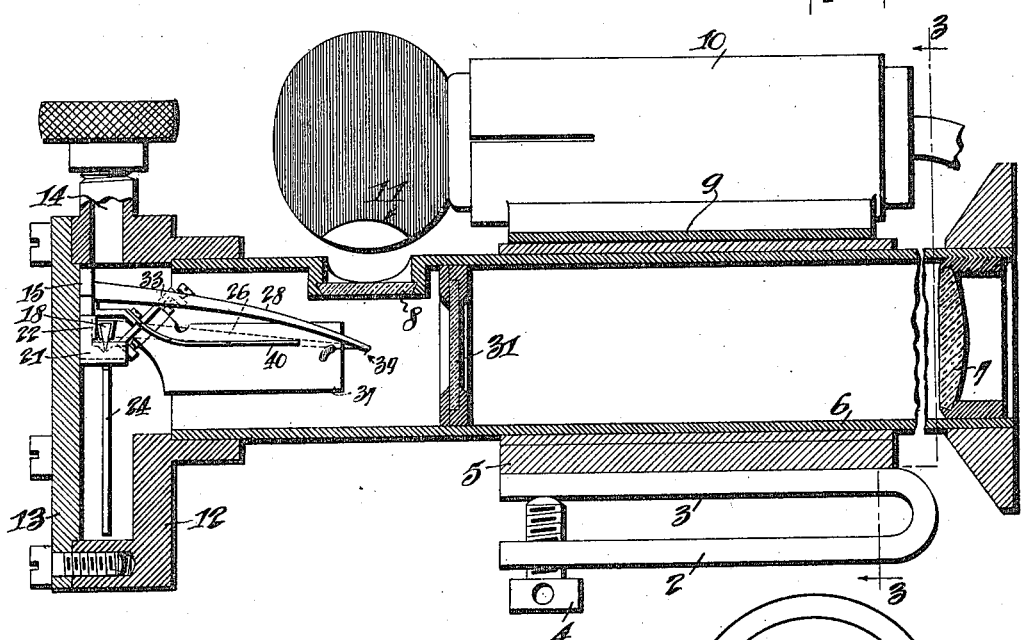
Fig. 2 is an enlarged vertical longitudinal section of the invention.

10 is a lamp socket mounted on a clip holder 9 that clips over the tube holder 5 and can be turned about the axis of the tube (see Fig. 3) so that the bulb will be brought with its transparent portion 11, to register with the window or be moved to one side out of register with the same (see dotted lines Fig. 3), it being understood that the bulb is preferably rendered opaque except for the area 11 directly above the window 8, when the parts are positioned as indicated in Figs. 1 and 2. The illuminating power for the lamp can be obtained from any desired source, either by a battery in the handle of the sextant or in any other desired way.

By referring more particularly to Figs. 2 to 7, inclusive, the construction and manner of mounting the pendulum-vanes will be clear.

15 designates a bracket body having knife bearing lugs 17 projecting from the same, the lugs having V-grooves to receive the knife ends 18, which are connected by the cross bar 20.

The knife bearing ends are beveled off (see Fig. 6) so that only a point will be presented to the end plates 21 at the pivotal axis of the pendulum to prevent lateral displacement of the bearing knives in their grooves.

The end plates 21 have ears 22 apertured and secured by screws to the bracket 15, the plates 21 lying against the bearing projections 17 at the ends of the knife bar, as shown. They are preferably of greater depth than the depth of the bearing projections, so as to form stops 32 to prevent the knives 18 falling out of the grooves 26, when the instrument is inverted or jarred.

The bracket body 15 is secured at 16 to the cap 13.

The knife bar 20 is provided with a plurality of recesses 23 (see Fig. 6) in which the arms 25 of the pendulum-vane 24 are held by bending the same around the bar 20, a third notch being provided to receive the end of the arm 26, which is rigidly secured to the bar 20 and projects into the tube 6, the arm 26 being provided, at its forward end, with a socket to hold a fine wire 27, preferably of platinum, the wire 27 lying parallel to the pivotal axis of the pendulum-vane 24 and in horizontal alinement with the same.

28 is a fixed arm that is secured at 29 to the bracket 15 and it also has a socket to hold the wire 30, preferably of platinum, the wires 27 and 30, when the apparatus is adjusted and the pendulum-vane 24 is at rest, lying in longitudinal alinement with one another, so as to constitute the artificial horizon line (see Figs. 2, 5 and 8).

33 designates an extension bracket which is secured to the bracket 15 and is provided with bearing recesses 34 and 35, the latter being contained in an adjustable screw for taking up wear, the bearings 34 and 35 being adapted to sustain a spindle 36 having its ends pointed to bear in the bearings 34 and 35 and so positioned that its axis will be in a vertical plane and inclined at an angle of preferably forty-five degrees to the horizontal.

Figure 4:
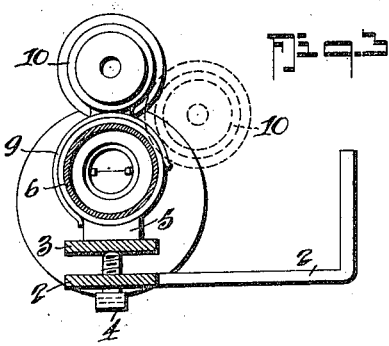
Fig. 4 is an enlarged elevation of the cap disk which supports the operative parts of the pendulum mechanism.

The bracket 33 is located centrally between the bearing lugs 17 and between the arms 26 and 28, as best shown in Figs. 4, 5 and 7.

37 is a second pendulum-vane of relatively small mass and great area. The vane 37 is adapted to lie between the arms 26 and 28 and is secured to the spindle 36, the vane 37 being adapted to swing its forward end toward one or the other of the arms 26 or 28 accordingly as the instrument is tilted to one side or the other of the vertical. The vane 37 is provided with a fine wire 38, preferably of platinum, which is extended out into close proximity to the wires 27 and 30 and it has its end turned over, as at 39, for a purpose presently explained.

In order not to interfere with the up and down movement of the wire 27, due to the movements of the pendulum vane 24, the curled over end 39 of the wire 38 does not extend entirely to the plane in which the wire 27 moves up and down, but lies sufficiently close thereto so that the point at which the light entering through the window 8 strikes the curled over end of the wire 38 and also strikes the wires 30 and 27, will be at substantially the principal focus of the lens.

In use, the light from the lamp is directed through the window 8 onto the wires 27 and 30 and the end 39 of wire 38 and transmitted as parallel rays by the lens 7 to the telescope of the sextant.

Figure 3:
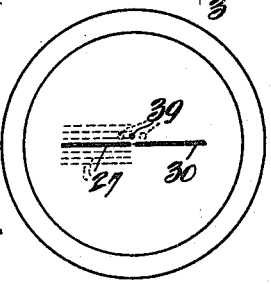
Fig. 3 is a reduced transverse section on the line 3—3 of Fig. 2, looking in the direction of the arrow.

In daylight observations, the necessary light may be admitted through the window from the sky and, in that event, the lamp is moved to the dotted position shown in Fig. 3, so as to expose the window 8.

A duct 14 is provided for delivering the liquid into the chamber in the receptacle 12 and into the end of the tube 6 forward of the partition 31, when it is desired to use liquid as the dampening medium, the duct 14 being closed by a removable cap.

In the preferred construction, the chamber in the receptacle 12 and tube 6 is substantially filled with a suitable limpid non-freezable oil, the oil being confined by the transparent partition 31.

The amount of dampening desired, either in air or in liquid, can be varied by varying the area of the vanes; the width of the space or clearance between the edges and sides of the containing chamber in which the vane 24 is located and the space between the faces of this vane and the walls of the chamber against which it swings, may also be varied to vary the amount of dampening.

In order to limit the movement of the vane 37, a fork 40 is provided, which straddles the vane and is secured at 41 to the bracket 33, the ends of the fork being spread apart the desired distance to allow the vane 37 sufficient motion for its purposes.

From the foregoing, it will be observed that, when the sextant is held in the true vertical and horizontal position, the wires 27 and 30 will be in longitudinal alinement as indicated in Fig. 8 and the end 39 of the wire 38 will appear in the vision as a dot lying midway between the lines 27 and 30 but above or below the same according as to whether the wire 38 is so positioned that the point of contact of the light rays entering through the window will strike the curled end 39 below or above the axis of the wire 30.

When the wires 27 and 30 and the dot 39 appear in the vision, as shown in full lines in Fig. 8 the lines 27 and 30 are in the position of the true horizon, and this combined line 27–30 constitutes the artificial horizon. The sextant arm is then adjusted to bring the image of the celestial or terrestrial object, either in contact with or bisected by this horizon line, whereupon the reading of the vernier on the arc will give the altitude of the body observed.

The dotted lines and dots in Fig. 8 indicate the movements of the wire 27 and the dot 38, depending upon the inclination of the instrument.

The present invention constitutes an improvement on the apparatus shown and described in my application Serial No. 301,920 filed June 5, 1919, and in this application I lay no claim, *per se*, to the matter shown and described in my former application and claimed in the same.

From the foregoing description, taken in connection with the accompanying drawings, it is thought the complete operation and uses of my invention will be readily understood by those skilled in the art.

What I claim is:

1. A device of the character described comprising a support, a pendulum-vane mounted on said support, a "line" carried by said pendulum-vane and a "line" relatively fixed with regard to said support and coöperative with said pendulum carried "line" to constitute an artificial horizon "line," a second pendulum-vane mounted on said support, a "line" carried by said second pendulum-vane and having an end located in close proximity to said aforesaid mentioned "lines" and coöperative with said "lines" to determine the true horizontal and vertical position of the instrument.

2. In a device of the character described, a support, pendulum-vanes mounted in said support, a relatively fixed indicator "line" mounted on the support, a second indicator "line" carried by one of said pendulum-vanes, and a third indicator "line" carried by the other pendulum-vane, a collimating lens carried by the support, said first and second "lines" being positioned to lie in axial alinement substantially passing through the principal focus of said lens when the instrument is in the horizontal position, the end of the third of said "lines" being positioned to lie in close proximity to said first and second "lines" and substantially in the principal focus of said lens, when the instrument is in the true horizontal and vertical positions, and means by which said "lines" may be illuminated to cause their image to be transmitted through the collimating lens.

3. A device of the character described comprising a support, pendulum-vanes mounted on said support, a "line" relatively fixed with regard to said support, and other "lines" carried by said pendulum-vanes and coöperative one with the other and each with said fixed "line" for the purposes specified, such "lines" lying in close proximity to one another.

4. In a device of the character described, a support, pendulum-vanes mounted on said support to lie with their axes at right angles, a relatively fixed indicator "line" and indicator "lines" carried by said pendulum-vanes to coöperate with said fixed "lines" for the purposes specified.

5. In a device of the character described, a support, pendulum-vanes mounted on said support to lie with their axes at right angles, a relatively fixed indicator "line" and indicator "lines" carried by said pendulum-vanes to coöperate with said fixed "lines," and means for limiting the movement of said vanes within definite limits.

6. A device of the character described comprising a support, a pendulum-vane mounted on said support, a "line" carried by said pendulum-vane and a "line" relatively fixed with regard to said support and coöperative with said pendulum carried "line" to constitute an artificial horizon "line," a second pendulum-vane mounted on said support, a "line" carried by said second pendulum-vane and having an end located in close proximity to said aforementioned "lines" and coöperative with said "lines" to determine the true horizontal and vertical position of the instrument, said vanes comprising thin bodies of relatively large area opposed to the direction of movement, said bodies being of small mass.

7. In a device of the character described, a housing inclosing a chamber, a bracket mounted within the housing and having bearings, a pendulum-vane mounted on said bearings, an indicator operative with said pendulum-vane, a second indicator relatively fixed and coöperating with said first mentioned indicator to constitute an artificial horizon "line," a second bracket having bearings, a second indicator vane mounted in said bearings and having an indicator movable adjacent to said first and second indicators to coöperate with the same.

8. In a device of the character described, a housing inclosing a chamber, a bracket mounted within the housing and having bearings, a pendulum-vane mounted on said bearings, an indicator operative with said pendulum-vane, a second indicator relatively fixed and coöperating with said first mentioned indicator to constitute an artificial horizon "line," a second bracket having bearings, a second indicator vane mounted in said bearings and having an indicator movable adjacent to said first and second indicators to coöperate with the same, and means for limiting the swing of said pendulum-vanes between predetermined limits.

9. In a device of the character described, a support having two sets of bearings, pendulum-vanes, one mounted in each set of bearings and lying substantially normal to one another, a fixed arm carried by said support and projecting in the longitudinal direction of one of said vanes, an arm on the other of said pendulum-vanes also projecting in the longitudinal direction of said one pendulum-vane, indicators carried by said arms, and an indicator carried by said one pendulum-vane, said indicators lying in proximity to one another for the purposes described.

10. In a device of the character described, a support having two sets of bearings, pendulum-vanes, one mounted in each set of bearings and lying substantially normal to one another, a fixed arm carried by said support and projecting in the longitudinal direction of one of said vanes, an arm on the other of said pendulum-vanes also projecting in the longitudinal direction of said one pendulum-vane, indicators carried by said arms, and an indicator carried by said one pendulum-vane, said indicators lying in proximity to one another, and means for limiting the movements of said pendulum-vanes.

11. In a device of the character described, a support having two sets of bearings, pendulum-vanes, one mounted in each set of bearings and lying substantially normal to one another, a fixed arm carried by said support and projecting in the longitudinal direction of one of said vanes, an arm on the other of said pendulum-vanes also projecting in the longitudinal direction of said one pendulum-vane, indicators carried by said arms, and an indicator carried by said one pendulum-vane, said indicators lying in proximity to one another, and a stop member straddling said one pendulum-vane and secured to said support to limit the movements of said pendulum-vane.

12. In a device of the character described, a fixed horizon "line," a movable horizon "line" and a pendulum for moving said movable horizon "line" in a direction at right angles to its axis, another pendulum having an indicating element the indicating portion of which lies in proximity to said "lines," said other pendulum adapted to move its indicating element in a direction substantially parallel to the axis of said "lines," substantially as shown and described.

13. In a device of the character described, a fixed horizon "line," a movable horizon "line" and a pendulum for moving said movable horizon "line" in a direction at right angles to its axis, another pendulum having an indicating element the indicating portion of which lies in proximity to said "lines," said other pendulum adapted to move its indicating element in a direction substantially parallel to the axis of said "lines," a collimating lens, and means for illuminating said "lines" to cause their images to be transmitted through the collimating lens, said horizon "lines" and the indicating portion of said other pendulum "line" lying substantially in the principal focus of said lens.

ERNST GEORG FISCHER.